(12) United States Patent
Harada et al.

(10) Patent No.: US 9,217,185 B2
(45) Date of Patent: Dec. 22, 2015

(54) METHOD OF REDUCTION PROCESSING OF STEEL-MAKING SLAG

(71) Applicant: NIPPON STEEL & SUMITOMO METAL CORPORATION, Tokyo (JP)

(72) Inventors: Toshiya Harada, Tokyo (JP); Takashi Arai, Tokyo (JP); Hiroshi Hirata, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/352,529

(22) PCT Filed: Jun. 27, 2013

(86) PCT No.: PCT/JP2013/067665
§ 371 (c)(1),
(2) Date: Apr. 17, 2014

(87) PCT Pub. No.: WO2014/003123
PCT Pub. Date: Jan. 3, 2014

(65) Prior Publication Data
US 2015/0135896 A1 May 21, 2015

(30) Foreign Application Priority Data

Jun. 27, 2012 (JP) ................................. 2012-144473
Jun. 27, 2012 (JP) ................................. 2012-144557
Oct. 25, 2012 (JP) ................................. 2012-235692

(51) Int. Cl.
*C21C 5/52* (2006.01)
*C21C 7/00* (2006.01)
(Continued)

(52) U.S. Cl.
CPC ................. *C21C 7/0087* (2013.01); *C04B 5/06* (2013.01); *C21C 5/527* (2013.01); *C21C 5/5229* (2013.01);
(Continued)

(58) Field of Classification Search
CPC .... C21C 7/0087; C21C 5/5229; C21C 5/527; C04B 5/06
See application file for complete search history.

(56) References Cited

U.S. PATENT DOCUMENTS 3,342,250 A 9/1967 Treppschuh et al.
3,905,589 A 9/1975 Schempp et al.
(Continued)

FOREIGN PATENT DOCUMENTS

AU 20553/95 A 12/1995
CA 2534623 A1 * 3/2005 ................ C21C 5/00
(Continued)

OTHER PUBLICATIONS

Chinese Office Action, dated Nov. 26, 2014, for Chinese Application No. 201380003875.0, with an English translation.
(Continued)

*Primary Examiner* — George Wyszomierski
*Assistant Examiner* — Tima M McGuthry Banks
(74) *Attorney, Agent, or Firm* — Birch, Stewart, Kolasch & Birch, LLP (57) ABSTRACT

The method of reduction processing of steel-making slag, includes: a hot steel-making slag inflow process of continuously or intermittently charging, from a slag supplying container, hot steel-making slag to a molten slag layer on a molten iron contained in an electric furnace while adjusting an amount of inflow with the slag supplying container; a reducing agent supplying process of supplying a reducing agent to the molten slag layer; an electrifying and heating process of heating the molten iron and the molten slag layer through application of electric power; and a reduction process of continuing reduction processing of the hot steel-making slag in a non-oxidizing atmosphere while intermittently discharging either one or both of the molten iron or molten slag of the molten slag layer.

6 Claims, 5 Drawing Sheets

(51) Int. Cl.
- *C04B 5/06* (2006.01)
- *F27D 15/00* (2006.01)
- *F27D 3/14* (2006.01)
- *F27B 3/18* (2006.01)
- *F27B 19/04* (2006.01)

(52) U.S. Cl.
CPC ............... *F27B 3/183* (2013.01); *F27B 19/04* (2013.01); *F27D 3/14* (2013.01); *F27D 15/00* (2013.01); *C21C 2005/5235* (2013.01); *C21C 2300/04* (2013.01)

(56) References Cited

U.S. PATENT DOCUMENTS

| | | | |
|---|---|---|---|
| 4,094,495 | A | 6/1978 | Kutscher et al. |
| 4,149,024 | A | 4/1979 | Stenkvist et al. |
| 4,199,350 | A | 4/1980 | Kutscher et al. |
| 4,274,867 | A * | 6/1981 | Bardenheuer et al. ......... 75/10.6 |
| 4,328,388 | A | 5/1982 | Longenecker |
| 4,641,319 | A | 2/1987 | Nagai et al. |
| 4,650,510 | A | 3/1987 | Tuovinen |
| 4,740,989 | A | 4/1988 | Steipe et al. |
| 5,173,920 | A | 12/1992 | Bochsler et al. |
| 5,238,484 | A | 8/1993 | Pirklbauer et al. |
| 5,715,272 | A | 2/1998 | Kaell et al. |
| 5,851,263 | A | 12/1998 | Bernet et al. |
| 6,549,558 | B1 | 4/2003 | Okada et al. |
| 6,748,004 | B2 | 6/2004 | Jepson |
| 7,597,736 | B2 * | 10/2009 | Fleischanderl et al. ...... 75/10.35 |
| 2001/0046251 | A1 * | 11/2001 | Vallomy ........................... 373/9 |
| 2002/0001332 | A1 | 1/2002 | Shver |
| 2003/0140732 | A1 | 7/2003 | Edlinger |
| 2006/0065071 | A1 | 3/2006 | Fleischanderl et al. |
| 2009/0249919 | A1 | 10/2009 | Degel et al. |

FOREIGN PATENT DOCUMENTS

| | | |
|---|---|---|
| CN | 1829891 A | 9/2006 |
| DE | 3543987 A1 | 7/1986 |
| DE | 102006052181 A1 | 5/2008 |
| EP | 1870479 A2 | 12/2007 |
| JP | 52-33897 A | 3/1977 |
| JP | 57-177911 A | 11/1982 |
| JP | 9-87728 A | 3/1997 |
| JP | 2001-152233 A | 6/2001 |
| JP | 2002-54812 A | 2/2002 |
| JP | 2002-69520 A | 3/2002 |
| JP | 2002-69526 A | 3/2002 |
| JP | 2003-520899 A | 7/2003 |
| JP | 2005-195224 A | 7/2005 |
| JP | 2006-528732 A | 12/2006 |
| JP | 2007-131928 A | 5/2007 |
| JP | 2008-49206 A | 3/2008 |

OTHER PUBLICATIONS

International Search Report issued in PCT/JP2013/067660 mailed Sep. 10, 2013.
International Search Report issued in PCT/JP2013/067665 mailed Sep. 10, 2013.
International Search Report issued in PCT/JP2013/067675 mailed Oct. 1, 2013.
Ye, G. et al. "Reduction of steel-making slags for recovery of valuable metals and oxide materials," Scandinavian Journal of Metallurgy, 2003, vol. 32, pp. 7-14.
Japanese Notice of Allowance, dated Apr. 8, 2014, for Japanese Application No. 2013-550690, with English translation.
Written Opinion of the International Searching Authority, dated Oct. 1, 2013, for International Application No. PCT/JP2013/067675.
Written Opinion of the International Searching Authority, dated Sep. 10, 2013, for International Application No. PCT/JP2013/067660.
Written Opinion of the International Searching Authority, dated Sep. 10, 2013, for International Application No. PCT/JP2013/067665.
U.S. Office Action, issued Apr. 24, 2015, for U.S. Appl. No. 14/352,925.
U.S. Office Action, issued Mar. 19, 2015, for U.S. Appl. No. 14/353,961.
Extended European Search Report for European Application No. 13808713.5, dated Jun. 19, 2015.
Extended European Search Report for European Application No. 13809399.2, dated Jun. 17, 2015.
Korean Notice of Allowance for Korean Application No. 10-2014-7012214, dated Jul. 13, 2015, with an English translation.
U.S. Office Action for U.S. Appl. No. 14/352,925, dated Aug. 25, 2015.

* cited by examiner

METHOD OF REDUCTION PROCESSING OF STEEL-MAKING SLAG

TECHNICAL FIELD

The present invention relates to a method of reduction processing of a steel-making slag that applies reduction processing to slag (steel-making slag) generated during steel making, and recovers valuable components while modifying properties of the steel-making slag so as to conform to various applications.

The present application claims priority based on Japanese Patent Application No. 2012-144473 filed in Japan on Jun. 27, 2012, Japanese Patent Application No. 2012-144557 filed in Japan on Jun. 27, 2012, and Japanese Patent Application No. 2012-235692 filed in Japan on Oct. 25, 2012, the disclosures of which are incorporated herein by reference in their entirety.

BACKGROUND ART

During the steel making processes, a large amount of steel-making slag is generated. Although the steel-making slag contains, for example, P and metal components such as Fe and Mn, it also contains a large amount of CaO, which leads to expansion and collapse. This has restricted the steel-making slag to be used as, for example, a material for roadbed or aggregate. However, in recent years, resources have been increasingly recycled, and a large number of methods for recovering the valuable substances from the steel-making slag has been disclosed.

Patent Document 1 discloses a method of processing iron and steel slag, which includes adding iron and steel slag generated during melting and making iron and steel, to molten iron and steel liquid in the smelting furnace, further adding heat and reducing agents, moving Fe, Mn, and P to the molten liquid while altering the iron and steel slag to obtain altered slag, and then, moving Mn and P in the molten liquid into the slag. However, this processing method requires batch processing to be continuously applied several times until a slag with predetermined components can be obtained, and hence, results in poor working efficiency.

Patent Document 2 discloses a method, which includes: supplying steel slags having iron oxide contents of more than 5 wt % onto a steel bath having a carbon content of less than 1.5 wt %; then introducing carbon or carbon carriers to carbonize the steel bath to obtain the steel bath having a carbon content of more than 2.0 wt %; and then performing reduction processing.

However, with the method described in Patent Document 2, the concentration of C (carbon concentration) in the molten iron is set to less than 1.5 wt % at the time of inserting the molten slag to suppress the discharge of the large amount of gas, and the concentration of C is increased to more than 2.0 wt % at the time of performing smelting reduction, thereby performing desired reduction. Thus, a process of de-carbonization in conjunction with an increase in temperatures and a process of addition of carbon for reduction are repeated, which results in batch processing. As a result, working efficiency deteriorates.

It should be noted that, since the method described in Patent Document 2 increases the concentration of C to more than 2.0 wt % at the time of performing the reduction processing, it is considered that this method promotes the reduction reaction mainly through the reaction between slag and metal.

Further, in the method described in Patent Document 2, the carbon material is used as the heat source as well as the reducing agent, and hence, the amount of exhaust gas increases. Thus, it is assumed that the thermal efficiency deteriorates, and the amount of dust generated increases.

Non-Patent Document 1 discloses results of reduction tests in which steel-making slag powder, carbon material powder, and slag-modifying agent powder are inserted through a hollow electrode into an electric furnace. However, in the reduction tests described in Non-Patent Document 1, processing is performed to the cold steel-making slag, which has been solidified and crushed, and hence, the energy-consumption rate is large.

Further, Patent Document 3 discloses a method of recovering valuable metals by reducing molten slags generated during smelting of non-ferrous metals using carbonaceous reducing agents in an open-type direct-current electric furnace to separate it into a metal phase and a slag phase. However, the method described in Patent Document 3 also involves the cold slag as the target of the processing, and hence, the energy-consumption rate is large.

As described above, these methods of recovering valuable components from the slags each have a problem of poor working efficiency or large energy-consumption rate.

RELATED ART DOCUMENT

Patent Document

Patent Document 1: Japanese Unexamined Patent Application, First Publication No. S52-033897

Patent Document 2: Published Japanese Translation No. 2003-520899 of the PCT International Publication Patent Document 3: Australia Patent No. AU-B-20553/95

Non-Patent Document

Non-Patent Document 1: Scandinavian Journal of Metallurgy 2003; 32: p. 7-14

DISCLOSURE OF THE INVENTION

Problems to be Solved by the Invention

As described above, with the conventional method that recycles the hot steel-making slag through batch processing, the working efficiency is poor. With the conventional method that recycles the cold steel-making slag as resources through melting, there is a problem of the high energy-consumption rate.

In view of the facts described above, an object of the present invention is to provide a method providing favorable working efficiency and reduced energy-consumption rate, by subjecting the steel-making slag to reduction processing, in order to (i) modify the steel-making slag into a material that can be used for various applications such as a cement raw material, a civil engineering material, and a ceramic product.

Further, another object of the present invention is to (ii) recover valuable elements such as Fe, Mn, and P into a molten iron by reduction, then, (ii-1) recycle Fe and Mn into steel-making processes, and (ii-2) apply oxidation processes to the molten iron to recover P in a form of oxide, and use it as phosphate fertilizer and phosphoric acid material.

Means for Solving the Problem

The following is the summary of the present invention.
(1) A first aspect of the present invention relates to a method of reduction processing of steel-making slag, which includes: a hot steel-making slag inflow process of continuously or intermittently charging, from a slag supplying container, hot steel-making slag to a molten slag layer on a molten iron contained in an electric furnace while adjusting an amount of inflow with the slag supplying container; a reducing agent supplying process of supplying a reducing agent to the molten slag layer; an electrifying and heating process of heating the molten iron and the molten slag layer through application of electric power; and a reduction process of continuing reduction processing of the hot steel-making slag in a non-oxidizing atmosphere while intermittently discharging the molten slag of the molten slag layer or the molten iron.
(2) In the method of reduction processing of steel-making slag according to (1) above, the hot steel-making slag inflow process may include adjusting the amount of inflow of the hot steel-making slag to the molten slag layer based on an amount of electric power supplied to the electric furnace.
(3) In the method of reduction processing of steel-making slag according to (1) or (2) above, the reduction process may include discharging, through the slag supplying container, exhaust gas emitted from the electric furnace.
(4) The method of reduction processing of steel-making slag according to any one of (1) to (3) above may further include a slag modifying agent supplying process of continuously or intermittently supplying a slag modifying agent to the molten slag layer.
(5) The method of reduction processing of steel-making slag according to any one of (1) to (4) above may further include a suspending process of adding, in the molten slag layer, a carbon material with an amount not less than 1.1 times and not more than 1.6 times the stoichiometric amount necessary for reduction reaction with the molten slag, thereby suspending.
(6) In the method of reduction processing of steel-making slag according to any one of (1) to (5) above, the concentration of C in the molten iron may be not more than 3 mass %.

Effects of the Invention

According to the aspect described above, it is possible to modify, at low cost, the steel-making slag into a material that can be used for various applications such as a cement raw material, a civil engineering material, and a ceramic products, and recover the valuable elements such as Fe, Mn, and P into the molten iron by reduction. Further, it is possible to recycle Fe and Mn into the steel-making processes, and use P as a phosphate fertilizer or phosphoric acid material.

EMBODIMENTS OF THE INVENTION

Considering the method that provides favorable working efficiency and reduced energy-consumption rate, which is the object of the present invention, it is effective to use the hot steel-making slag (hereinafter, also referred to as a steel-making slag) from the viewpoint of reducing the energy-consumption rate. However, when the hot steel-making slag flows onto the molten iron in the electric furnace, there occurs a phenomenon (slag foaming) that the steel-making slag rapidly reacts with the molten iron and suddenly boils, and the slag may spill over (overflow) from the electric furnace if this phenomenon strongly occurs.

As described above, in the method described in Patent Document 2, this rapid boiling phenomenon is solved by "slowing the reaction speed by reducing the concentration of C in the molten iron." However, with this method, the working efficiency deteriorates.

More specifically, in the present invention, a similar problem arises as a problem to be solved, and C in the molten iron reduces FeO in the slag in a reduction furnace such as a converter, which promotes reduction reaction through reaction between the slag and the metal. Thus, in order to improve the ability to reduce, it is necessary to repeat de-carbonization and carbonization, which results in deteriorated working efficiency.

In view of the facts described above, the present inventors made a keen study, and newly found through experiments that, during the reduction reaction in the electric furnace, a reaction between FeO and C in the slag more predominantly occurs, rather than a reaction between the slag and the metal. Then, it was found that, by using reduced C concentration of approximately 1.5 mass %, it is possible to perform the reduction processing of the slag without the need of carbonizing, although the ability to reduce is slightly lower, and with this method, it is possible to improve the working efficiency.

Thus, by using the electric furnace, it is possible to suppress the slag foaming, which suddenly occurs at the time of charging the steel-making slag, and the above-described method can be one of the measures for preventing the slag from overflowing.

However, there is a possibility that the concentration of C in the molten iron is high. Thus, a study was also made on a method that provides favorable working efficiency while reducing the energy-consumption rate, even if the concentration of C in the molten iron is high.

As a result, regarding a specific method for supplying hot steel-making slag, which has fluidity while hot, directly into the electric furnace while preventing overflow, it was found through experiments that, from the viewpoint of suppressing the phenomenon of sudden boiling of the molten slag while avoiding the overflow, it is preferable to employ the following two methods:

(a) temporarily place the hot steel-making slag, having fluidity while hot, in a device capable of adjusting the amount of flow of it into the electric furnace, and then, charge the hot steel-making slag into the electric furnace while adjusting the amount of flow of it into the electric furnace so as not to overflow the hot steel-making slag in the electric furnace; and (b) pre-form a molten slag layer, preferably an inactive molten slag layer (reduced slag layer) serving as a buffer zone on the molten iron, and then, flow the hot steel-making slag onto the buffer zone.

Further, it was also found that it is more preferable to employ, in addition to the methods (a) and (b) described above:

(c) supply, in advance, a carbon material to the hot steel-making slag in an excessively suspended manner; and (d) reduce the concentration of C in the molten iron to not more than 3 mass % (provided that strong reduction is not necessary).

The present invention is based on a technical idea that the energy-consumption rate can be lowered by performing the reduction processing during the time when the steel-making slag is hot and has fluidity.

More specifically, the present inventors reached an idea that it is possible to utilize, as resources, steel-making slag generated in the steel-making processes with reduced energy-consumption rate, by charging the steel-making slag into the electric furnace, during the time when it is hot and has fluidity to reduce the steel-making slag, recovering valuable components, and modifying the slag.

Below, a method of processing a steel-making slag according to an exemplary embodiment of the present invention will be described in detail with reference to the drawings.

The steel-making slag, to which the method of processing the steel-making slag according to this exemplary embodiment is directed, is only necessary to be slag generated during the steel-making processes, and is not limited to slag having specific composition.

In the method of processing the steel-making slag according to this exemplary embodiment, a hot steel-making slag having fluidity while hot is charged continuously or intermittently from a slag supplying container, which will be described later, onto a molten slag layer on a molten iron in an electric furnace, in other words, onto a layer of molten slag (hereinafter, also simply referred to as a "molten slag layer") generated on the molten iron through the application of reduction processing to steel-making slag, and reduction processing is continuously performed.

The electric furnace accommodates, for example, 100 to 150 tons of molten iron. The concentration of C in the molten iron influences a reduction ability to reduce iron oxide in the molten slag, and hence, is preferably set in accordance with the target reduction level of the molten slag.

The concentration of C in the molten iron is usually set in the range of 1.5 to 4.5 mass %. It was found through experiments that the concentration (mass %) of C in the molten iron and the "total Fe" (mass %) in the molten slag after the reduction processing correlate with each other. More specifically, the correlation was found by measuring relationships of the "total Fe" (mass %) in the molten slag after the reduction processing under conditions where the concentration (mass %) of C in the molten iron was varied using an experimental furnace.

Figure 5:
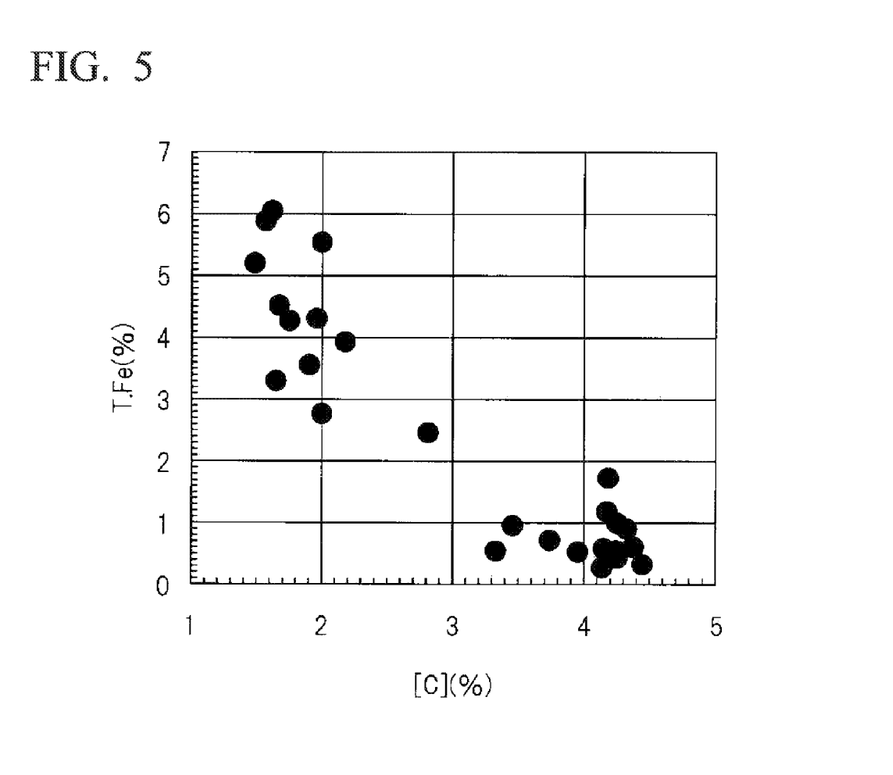
FIG. 5 is a diagram illustrating a relationship the concentration of C in a molten iron and the "total Fe" of the molten slag.

FIG. 5 shows the results. It can be understood that, if the concentration of C in the molten iron exceeds 3 mass %, the reduction of the iron oxide in the molten slag is facilitated, and the "total Fe" in the molten slag is decreased to not more than 2 mass %. Note that, in these experiments, the "total Fe" in the steel-making slag before the reduction processing was 18.6 mass %.

Although there is no limitation on the component of the molten iron, an example of the component is shown in Table 1. However, the amounts of Mn and P ([Mn], [P]) tend to increase with the advancement in reduction of the molten slag.

TABLE 1

|  | [C] | [Si] | [Mn] | [P] | [S] | (mass %) Temperature |
|---|---|---|---|---|---|---|
| Composition of molten iron | 3.0 | 0.01 | 0.32 | 0.12 | 0.024 | 1450° C. |

Figure 1:
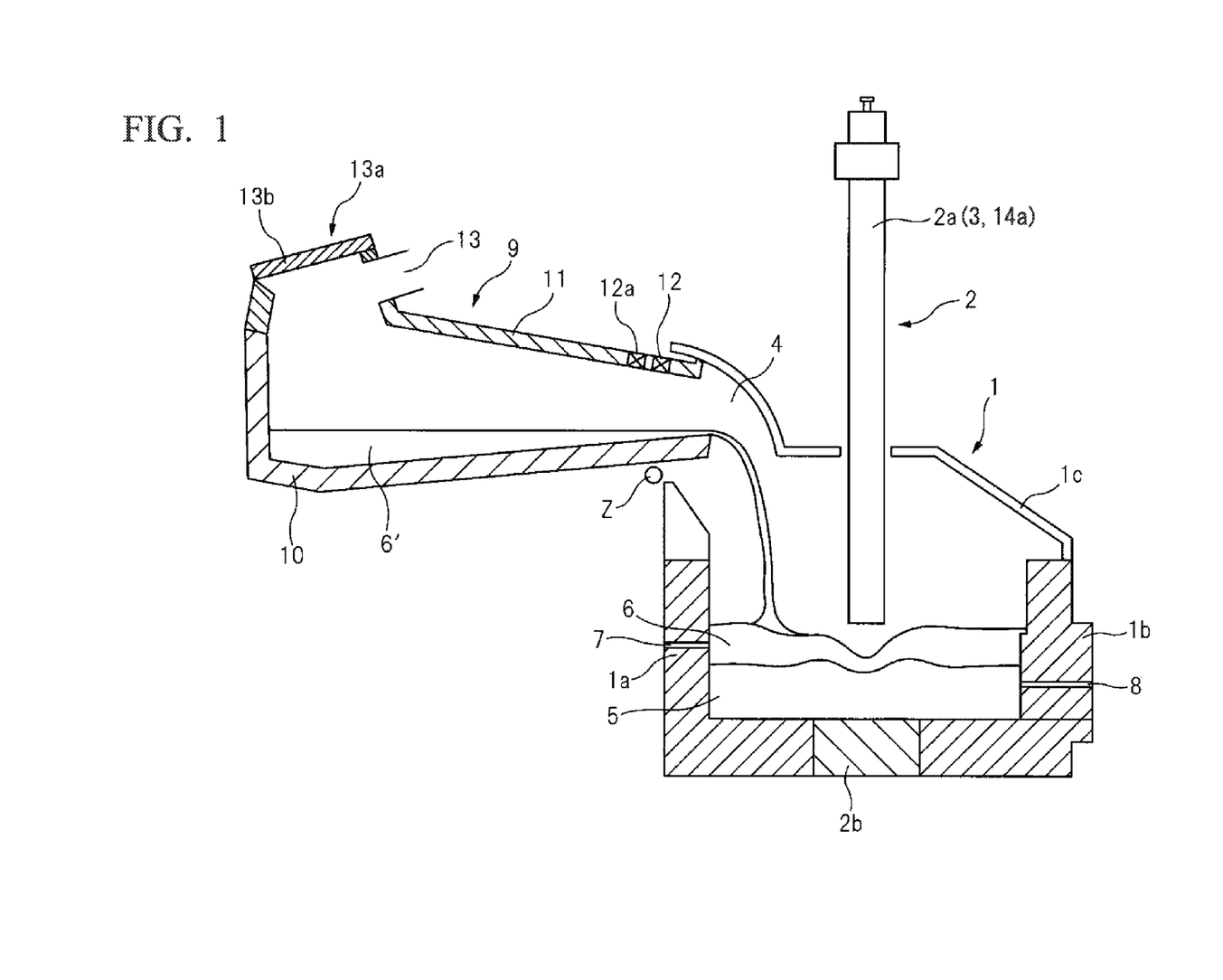
FIG. 1 is a schematic view illustrating an example of an electric furnace and a slag supplying container used for performing a method of reduction processing of a steel-making slag according to an exemplary embodiment of the present invention.

FIG. 1 illustrates an example of an electric furnace 1 and a slag supplying container 9 used for performing a method of reduction processing of steel-making slag according to this exemplary embodiment.

The electric furnace 1 has, at its left upper portion in the drawing, a slag supplying container 9 that charges hot steel-making slag 6' having fluidity while hot (for example, at temperatures not less than 300° C.) through a slag supplying portion 4 into the electric furnace 1. This slag supplying container 9 is configured, for example, so as to be able to be tilted at a given angle with a tilting axis z being the center, so that the amount of inflow of the hot steel-making slag 6' into the electric furnace 1 can be adjusted.

This electric furnace 1 is a fixed-type and closed-type direct-current electric furnace without having an opening on the furnace wall. Further, the slag supplying container 9 is provided with an exhausting portion 13 from which exhaust gas generated in the electric furnace 1 is discharged through the slag supplying portion 4.

In the case where the exhausting portion 13 is connected to an external dust collector (not illustrated), the atmosphere in the slag supplying container 9 can always be kept under negative pressure, which is preferable. In this case, even if external air enters from a clearance at the connection portion between the slag supplying container 9 and the electric furnace 1, the entering external air flows into the slag supplying container 9.

By configuring the electric furnace 1 to be a closed type and configuring the slag supplying container 9 to be an exhaust path, it is possible to maintain the atmosphere in the electric furnace 1 to be a non-oxidizing atmosphere (reducing atmosphere) containing the primary component formed by CO gas generated through the reduction reaction and $H_2$ generated from reducing agents supplied (carbon material). Thus, it is possible to prevent oxidation reaction from occurring at the surface of the molten slag 6 disposed on the molten iron 5 in the electric furnace 1.

Figure 6:
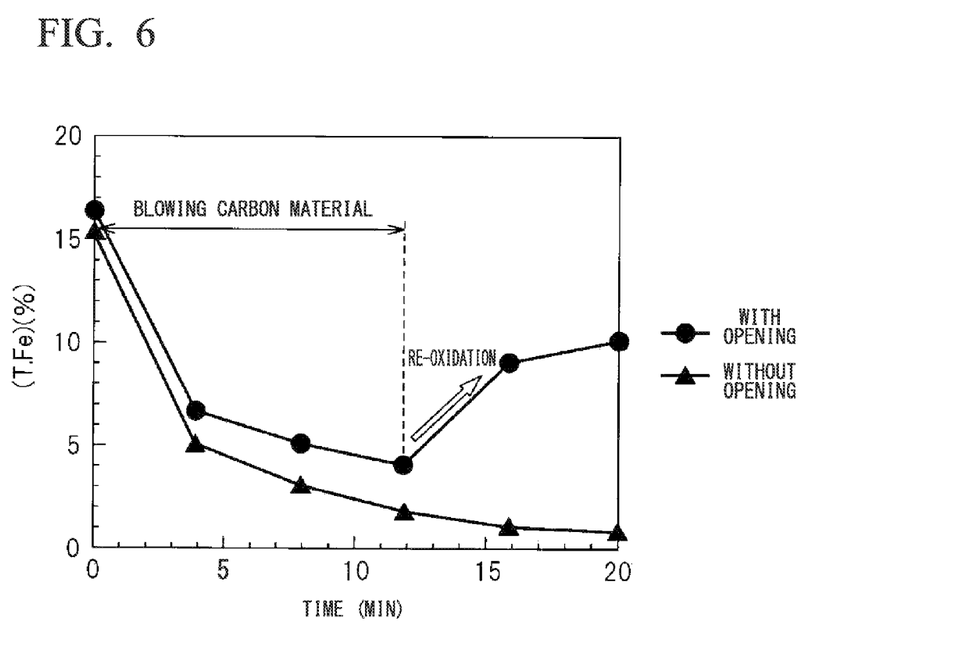
FIG. 6 is a comparative diagram illustrating changes with time in the "total Fe" in the molten slag in the electric furnaces with or without the opening portion.

Here, FIG. 6 illustrates the comparison of the "total Fe" (%) in the molten slag 6 between the electric furnace 1 having or not having the opening at the furnace wall thereof. By blowing the reducing agent (carbon material) into the electric furnace 1 to subject the molten slag 6 to reduction processing, the "total Fe" in the molten slag 6 reduces. However, with the opening at the furnace wall of the electric furnace 1, the inside of the electric furnace 1 becomes an atmospheric environment, and the surface of the molten slag 6 is re-oxidized. Once the blowing of the reducing agent ends, the "total Fe" in the molten slag 6 started to increase due to the re-oxidation.

On the other hand, in the case where the opening is not provided at the furnace wall of the electric furnace 1, the inside of the electric furnace 1 is maintained to be the reducing atmosphere. Thus, the re-oxidation did not occur at the surface of the molten slag 6, and the reduction reaction of FeO advanced due to C in the molten slag 6 and the molten iron 5, whereby the "total Fe" in the molten slag 6 reduced.

On the side of the bottom portion of the electric furnace 1, the molten iron 5 is accommodated, and on the molten iron 5, there formed a layer of the molten slag 6 (molten slag layer) obtained through the reduction processing of the hot steel-making slag 6' coming from the slag supplying container 9. The slag supplying container 9 and the charging of the hot steel-making slag 6' into the electric furnace 1 will be described later.

The electric furnace 1 is a fixed-type and closed-type direct-current electric furnace as described above, and is provided with electrode 2 formed by an upper electrode 2a and a furnace bottom electrode 2b that are paired in the vertical direction. With this electrode 2, it is possible to apply electric power to the layers of the molten iron 5 and the molten slag 6 to heat them. The electric furnace 1 has a furnace side wall 1a provided with a cinder notch 7 that intermittently discharges the molten slag 6, and a furnace side wall 1b provided with a tap hole 8 that intermittently discharges the molten iron 5.

To prevent the furnace side wall 1a and the furnace side wall 1b from damaging by melting, it is preferable that the cinder notch 7 and the tap hole 8 are not disposed close to each other on the same furnace side wall, and it is only necessary that they are spaced apart in a distance that can prevent the furnace side wall 1a and the furnace side wall 1b from damaging by melting. Note that the furnace side wall 1a, the furnace side wall 1b, and a furnace ceiling 1c are cooled with a jacket or by water spraying cooling (not illustrated).

The electric furnace 1 may be provided with a raw-material supplying unit (not illustrated) that supplies iron materials such as small scrap iron and direct reduced iron (DRI) to the molten iron 5. The electric furnace 1 can produce the molten iron 5 by melting and reducing the small scrap iron, reduced iron, powder dusts, and the like.

Figure 2:
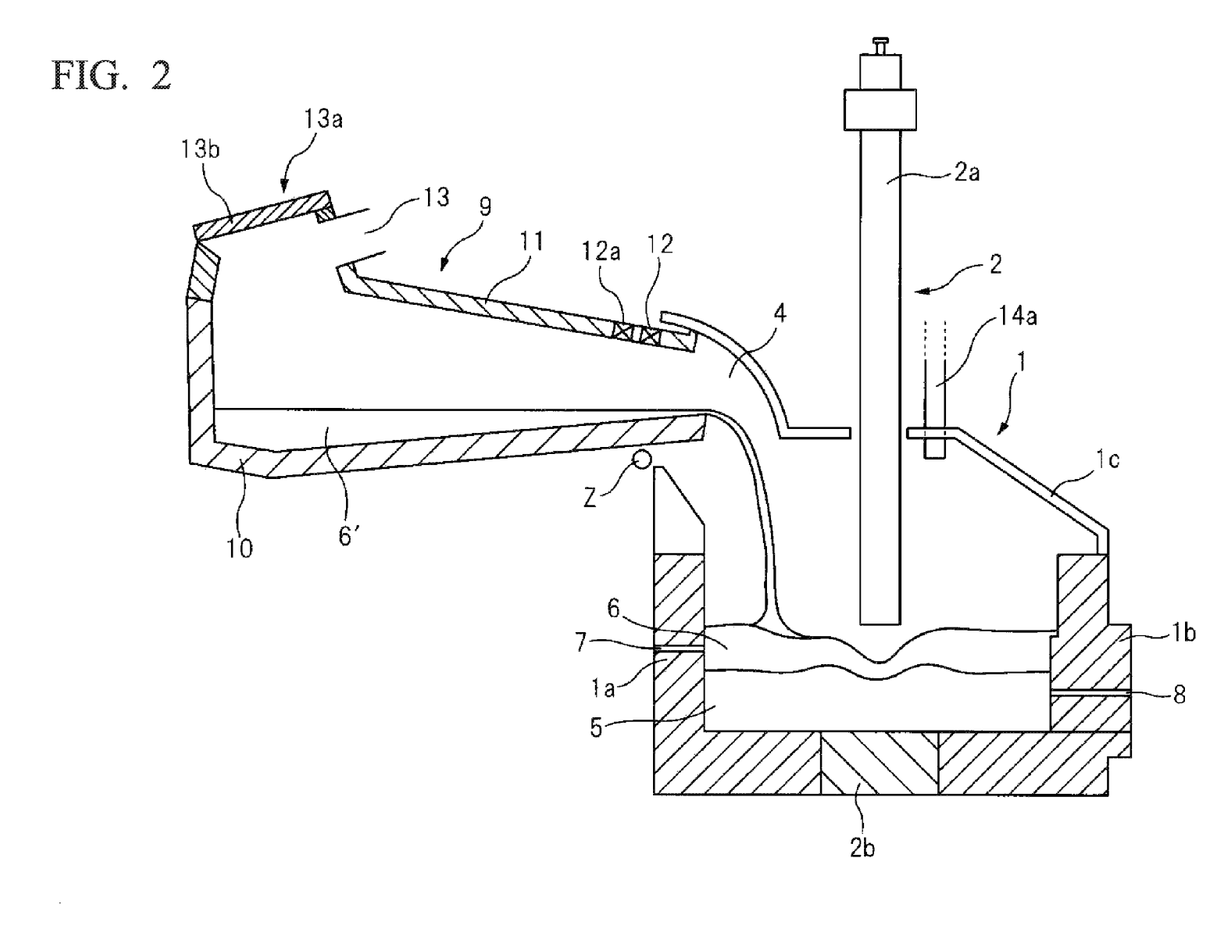
FIG. 2 is a schematic view illustrating another example of the electric furnace and the slag supplying container used for performing the method of reduction processing of a steel-making slag according to an exemplary embodiment of the present invention.

The electric furnace 1 may be provided with an auxiliary-raw-material supplying tube 14a that supplies reducing agents necessary for reduction, and auxiliary raw materials such as modifying powder that modify properties of the molten slag 5. FIG. 2 illustrates a mode in which the auxiliary-raw-material supplying tube 14a is attached to the furnace ceiling 1c. By supplying the auxiliary raw materials (for example, reducing agents and modifying powder) from the auxiliary-raw-material supplying tube 14a into the electric furnace 1, the amount of gas generated in the electric furnace 1 is reduced. Hence, the auxiliary raw materials fall with the force of gravity onto the surface of the molten slag 6, and are mixed with the molten slag 6.

Further, it may be possible to form the upper electrode 2a of the electrode 2 so as to be a hollow electrode, and use the hollow portion as the auxiliary-raw-material supplying tube 14a. By using the hollow electrode, it is possible to directly blow the auxiliary raw materials (for example, reducing agent and modifying powder) into the arc spot.

Figure 3:
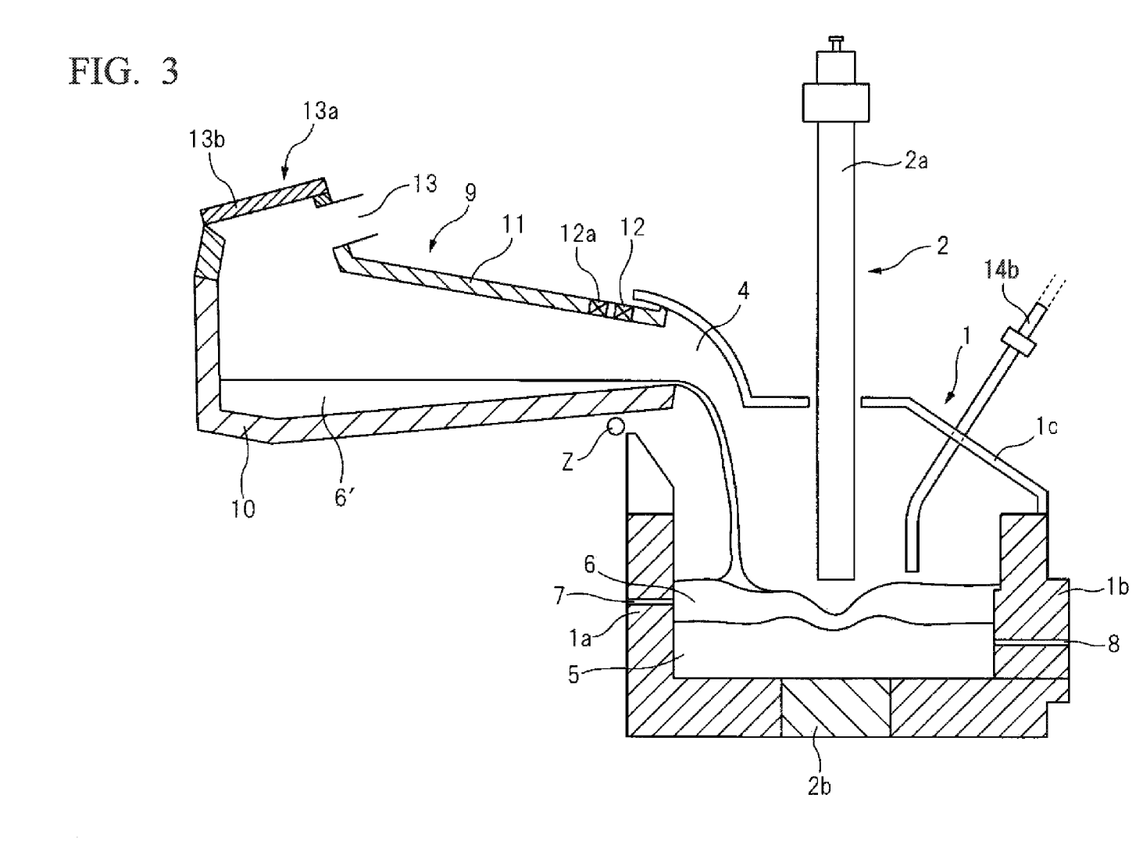
FIG. 3 is a schematic view illustrating another example of the electric furnace and the slag supplying container used for performing the method of reduction processing of a steel-making slag according to an exemplary embodiment of the present invention.

The electric furnace 1 may be provided with a lance 14b for blowing an auxiliary raw material, to supply, into the electric furnace 1, powders (auxiliary raw material) that are more likely to spatter. FIG. 3 illustrates a mode in which the electric furnace 1 is provided with the lance 14b for blowing an auxiliary raw material disposed through the furnace ceiling 1c in a manner that penetrates the furnace ceiling 1c.

The slag supplying container 9 is provided with an opening portion 13a for receiving the supply of the hot steel-making slag 6' from a slag pot (not illustrated). The opening portion 13a may be closed with a lid 13b when the hot steel-making slag 6' is not supplied from the slag pot (not illustrated). The slag supplying container 9 may be provided with an adding unit (not illustrated) that adds modifying agents for modifying the hot steel-making slag 6'.

The slag supplying container 9 can be tilted at a given angle with the tilting axis z being the center. Thus, the slag supplying container 9 can deal with the following cases:

(i) the hot steel-making slag 6' charged from the slag pot through the opening portion 13a is temporarily stored and held, and then, is charged from the slag supplying portion 4 onto the layer of the molten slag 6 on the molten iron 5 in the electric furnace 1 while the amount of flow is being adjusted; and (ii) the hot steel-making slag 6' charged from the slag pot through the opening portion 13a is charged directly onto the layer of the molten slag 6 on the molten iron 5 without being temporarily stored and held. It may be possible to select and use an appropriate charging method depending on the amount of the hot steel-making slag 6' supplied from the slag pot.

It is preferable to make the bottom wall 10 of the slag supplying container 9 out of refractories, and make the upper wall 11 out of a water-cooled refractory lining wall. Further, the slag supplying container 9 is connected through the slag supplying portion 4 to the electric furnace 1.

The slag supplying container 9 may be provided with a nozzle 12 that blows oxygen or gas containing oxygen into exhaust gas containing CO and $H_2$. By burning the exhaust gas in the slag supplying container 9, the hot steel-making slag 6' is prevented from being solidified and attached, and the hot steel-making slag 6' is maintained at temperatures at which the hot steel-making slag 6' can secure sufficient fluidity. For example, such temperatures are 1300° C. or higher in the case of general steel-making slag. However, such temperatures are not limited to those described above as the lower limit temperatures, provided that the fluidity is secured. For example, the temperature may be 800° C. or higher, or 300° C. or higher.

The slag supplying container 9 may be provided with a burner 12a, since there is a possibility that the inside of the slag supplying container 9 does not rise to temperatures at which the hot steel-making slag 6' does not adhere to the slag supplying container 9 even by using sensible heat of the exhaust gas and combustion heat.

The slag supplying container 9 is provided with a tilting unit (not illustrated). By tilting the slag supplying container 9 with the tilting unit with the tilting axis z being the center, the steel-making slag on the surface layer of the hot steel-making slag 6' is caused to flow from the slag supplying portion 4 into the electric furnace 1. The specific supplying method will be described later.

<Method of Charging Molten Slag into Electric Furnace>

First, a method (a) will be described below.

(a) The hot steel-making slag 6', having fluidity while hot, is temporarily held in a device that can adjust the amount of inflow into the electric furnace 1, and then, is charged while the amount of inflow into the electric furnace 1 is being adjusted in a manner such that the hot steel-making slag 6' does not overflow in the electric furnace 1.

It is only necessary for the hot steel-making slag 6', which is to be processed in the method according to this exemplary embodiment, to have fluidity sufficient to continuously or intermittently flow into the electric furnace 1, and it is not necessary for the hot steel-making slag 6' to be in the completely melted state. The rate of solid phase in the hot steel-making slag 6' is not specifically limited. However, it is preferable to set it to not more than approximately 30% at approximately 1400° C., at which it is possible to secure fluidity sufficient to flow into the electric furnace 1. Note that the rate of solid phase can be calculated using a commercially available software.

By tilting the slag supplying container 9, the hot steel-making slag 6' in the slag supplying container 9 is continuously or intermittently charged while the amount of inflow is being adjusted in a manner such that the molten slag 6 does not overflow from the electric furnace 1. In the case where the hot steel-making slag 6' is intermittently charged, it may be possible to employ the following modes:

(i) a mode in which the hot steel-making slag 6' is charged by appropriately repeating charging and stopping the hot steel-making slag 6', or (ii) a mode in which a predetermined amount of the hot steel-making slag 6' is collectively supplied at predetermined intervals of time.

The amount of inflow of the hot steel-making slag 6' is determined according to the amount of electric power supplied to the electrode 2. In other words, the amount of inflow of the hot steel-making slag 6' continuously or intermittently charged is calculated on the basis of the electric power consumption rate necessary for the steel-making slag reduction processing and the amount of electric power actually supplied.

It should be noted that the electric power consumption rate necessary for the reduction processing applied to the steel-making slag can be obtained through heat balance calculation in which heat of reaction and heat radiation are taken into consideration. However, the electric power consumption rate described above is an estimated value obtained through the heat balance calculation, and hence, the error appears in a form of change in temperatures of the molten slag 6 in the electric furnace 1.

The change in the temperatures of the molten slag can be controlled by adjusting the amount of inflow of the hot steel-making slag 6' or the amount of reducing agents supplied. In general, the temperatures in the electric furnace 1 are controlled, for example, such that the temperatures of the molten iron fall in the range of 1400 to 1550° C., and the temperatures of the molten slag fall in the range of 1500 to 1650° C.

When the hot steel-making slag 6' is charged into the electric furnace 1 by tilting the slag supplying container 9, the hot steel-making slag 6' is charged in a manner such that the hot steel-making slag 6' located in the surface layer having a higher temperature is charged into the electric furnace 1. This makes it possible to update the surface layer of the hot steel-making slag 6' having a high temperature and located in the slag supplying container 9, thereby improving the heat efficiency concerning the hot steel-making slag 6' remaining in the slag supplying container 9.

If the charging rate is too fast at the time of charging the hot steel-making slag 6' into the electric furnace 1, the amount of gas generated temporarily increases, and the molten slag 6 becomes in a foaming state, possibly leading to an abnormal state such as overflow. In such a case, it is recommended to settle the state by reducing the angle of tilt of the slag supplying container 9 to temporarily stop charging the hot steel-making slag 6', or increase the rate at which the reducing agents are supplied.

It should be noted that it is possible to detect whether the abnormal state such as overflow occurs or not, for example, by monitoring situations of the inside and outside of the furnace with a monitoring camera, by monitoring the behavior of the hot steel-making slag 6' with a sound meter, and by monitoring the surface level of the molten slag with radiation of microwave.

In addition to the method of adjusting the amount of inflow with the slag supplying container 9 (see the method (a) described above), the following method (b) may be given as the method of preventing the molten slag 6 from foaming and overflowing from the electric furnace 1, and this method (b) may be used in combination with the method (a).

(b) By causing reduced slag to exist as slag located on the molten iron 5, it is possible to make it function as a buffer zone. This makes it possible to dilute and lower the concentration of FeO in the hot steel-making slag 6' to be charged, and reduce the possibility that the hot steel-making slag 6' and the molten iron 5 are brought into contact with each other.

In other words, by causing the molten slag 6 obtained after reduction processing to exist as a buffer zone on the surface of the molten iron 5, it is possible to reduce the concentration of FeO in this molten slag 6 and reduce the possibility that the molten slag 6 and the molten iron 5 are brought into contact with each other, which makes it possible to prevent the molten slag 6 from foaming. As a result, it is possible to prevent the molten slag 6 from overflowing from the electric furnace 1.

Next, a method of processing the molten slag 6 in the electric furnace 1 will be described.

<Processing of Molten Slag>

An appropriate amount of the molten iron 5 is contained in advance as hot metal in the electric furnace 1. Then, the hot steel-making slag 6' having an amount equivalent to the rate of the electric power supplied to the electric furnace 1 is charged from the slag supplying container 9 onto the molten slag 6 on the molten iron 5 to continuously maintain the layer of the molten slag 6.

In the case where the hot steel-making slag 6' is continuously supplied to the electric furnace 1, the rate of supply needs to accord with the rate of electric power supplied to the electrode 2 in the long term, but does not need to accord with the rate of electric power supplied to the electrode in the short term. This is because, in the case where a predetermined amount of the hot steel-making slag 6' is intermittently charged into the electric furnace 1, the amount of inflow does not accord with the rate of electric power supplied to the electrode 2 in the short term.

It should be noted that, in the case where the hot steel-making slag 6' is charged intermittently, it is important to experimentally check, in advance, that the amount of the hot steel-making slag 6' set for each charge does not cause slag foaming and the resulting overflow.

In order to perform the reduction processing to the molten slag 6, located on the molten iron 5, onto which the hot steel-making slag 6' is charged, it is necessary to supply, in the electric furnace 1, the reducing agent having an amount corresponding to the amount of the hot steel-making slag 6' charged in the electric furnace 1.

In general, carbon materials are used as the reducing agent. As the carbon materials, it may be possible to use, for example, coke ash, anthracite culm, graphite powder, dust powder containing carbon, and fly ash.

The method of blowing the reducing agents may be performed by using a method (see FIG. 2) of continuously or intermittently supplying them from the auxiliary-raw-material supplying tube 14a provided to the furnace ceiling 1c, or by supplying them from the hollow portion of the hollow electrode or the auxiliary-raw-material blowing lance 14b as described above (see FIG. 1 and FIG. 3). At this time, it may be possible to mix the reducing agents with at least one material of the slag modifying agent and a raw material containing iron, and continuously or intermittently blow the mixture.

The slag modifying agent is used mainly for adjusting ($SiO_2$) or ($Al_2O_3$), and it is necessary to select an appropriate material for the slag modifying agent. It is preferable for the slag modifying agent to contain one type or two or more types selected from $SiO_2$, CaO, $Al_2O_3$, and MgO. Further, it may be possible to use, as the slag modifying agent, coal ash, slag powder containing the large amount of $SiO_2$ and $Al_2O_3$, brick chips, aluminum dross, and the like. It is preferable for the raw material containing iron to include one type or two or more types selected from iron scrap, reduced iron, and powder dust.

Further, as for the method of preventing the molten slag 6 from foaming and overflowing from the electric furnace 1, it may be possible to use the following method in combination.
(c) A method of suspending, in the molten slag layer, a carbon material with the excessive amount relative to the amount necessary for the reduction processing.

As for the excessive amount relative to the amount necessary for the reduction processing, it is preferable to blow, onto the molten slag 6, the reducing agent (powder carbon) for suspending, in the quantity 1.1 to 1.6 times the stoichiometric amount necessary for the reduction reaction with the molten slag 6.

If the reducing agent (powder carbon) is less than 1.1 times the stoichiometric amount, it is difficult to achieve the effect of suppressing foaming obtained as a result of the addition of the reducing agent (powder carbon). If the reducing agent exceeds 1.6 times the stoichiometric amount, the further effect of suppressing foaming cannot be obtained.

Further, as for the method of preventing the molten slag 6 from foaming and overflowing from the electric furnace 1, it may be possible to use the following method in combination.
(d) A method of reducing the concentration of C in the molten iron 5 to not more than 3 mass %.

This method is based on the experimental finding that the reduction in the concentration of C in the molten iron 5 to not more than 3 mass % makes it easy to prevent the molten slag 6 from foaming and overflowing from the electric furnace 1.

In the method according to this exemplary embodiment, the molten slag 6 subjected to the reduction processing is intermittently discharged from the cinder notch 7 provided on the side wall at the bottom of the furnace, and the molten iron 5 is intermittently discharged from the tap hole 8 while the hot steel-making slag 6' having fluidity when it is hot is being continuously or intermittently charged from the slag supplying container 9 to the electric furnace 1. With these processes, in the electric furnace 1, it is possible to keep performing the reduction processing of the molten slag 6, formed by charging the hot steel-making slag 6' having fluidity while hot, without interruption.

In other words, in the method according to this exemplary embodiment:
(a) it is possible to continuously or intermittently charge the hot steel-making slag 6' in the electric furnace 1 in accordance with the rate of electric power supplied, and reduce the variation in temperatures of the molten slag layer in the electric furnace 1; and
(b) because of the reduction in the possibility of occurrence of sudden boiling caused by sudden reaction between the molten slag 6 and the molten iron 5, it is possible to intermittently discharge the molten slag 6 subjected to the reduction processing, and efficiently continue performing the reduction processing of the molten slag 6 in the electric furnace 1 in which the hot steel-making slag 6' is charged, without interruption.

Figure 4:
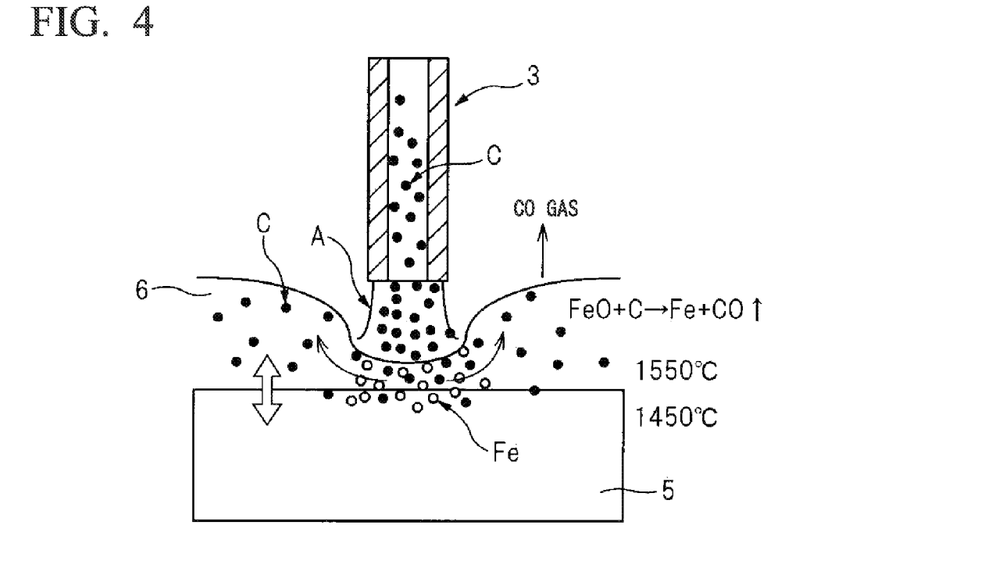
FIG. 4 is a diagram illustrating a reaction mode in a molten slag layer in the case where a hollow electrode is used.

Here, FIG. 4 illustrates a reaction mode in the molten slag layer in the case where the hollow electrode is used. In the reaction mode illustrated in FIG. 4, the powder C of carbon material (reducing agent) is blown from the hollow electrode 3 onto the molten slag 6 heated with an arc A.

The powder C of carbon material does not move to the molten iron 5, and is suspended in the molten slag 6. Thus, the reaction of FeO+C→Fe+CO↑ is less likely to occur at an interface between the molten iron 5 and the molten slag 6, and the reaction of FeO+C→Fe+CO↑ takes precedence in the molten slag 6. Then, the reduced iron generated (Fe in the drawing) moves to the molten iron 5.

In the processes of the molten slag 6, it is preferable to always monitor temperatures of the molten slag 6. In the case where the temperatures of the molten slag 6 are in the rising tendency or decreasing tendency, it may be possible to temporarily adjust the amount of electric power supplied. Further, in the case where variation in the temperatures is small, it is possible to keep the temperatures of the molten slag 6 almost constant by changing the rate of inflow of the hot steel-making slag and/or the rate of carbon material supplied.

The thickness of the layer of the molten slag 6 in the electric furnace 1 is adjusted depending on the conditions of operations, and is set preferably in the range of 100 to 800 mm, and more preferably in the range of 100 to 600 mm. In the case where the thickness of the layer of the molten slag 6 is thin, the arc frame is exposed, and loss of radiant heat increases. In the case where the thickness of the layer of the molten slag 6 is thick, the contact surface between the electrode and the molten slag 6 increases, which leads to an increase in the wear of the electrode 2. In the case where the thickness of the layer of the molten slag 6 is thick, it is necessary to increase voltage. However, if voltage is excessively increased, the electric discharge with the furnace wall is more likely to occur. Hence, it is important to set the upper limit of voltage by taking this point into consideration.

If the thickness of the layer of the molten slag 6 in the electric furnace 1 reaches a predetermined level, the cinder notch 7 is opened to discharge the molten slag 6 to the outside of the electric furnace 1. Further, if the interface between the molten slag 6 and the molten iron 5 approaches the vicinity of the cinder notch 7, the tap hole 8 located below the cinder notch 7 is opened to discharge the molten iron 5. If the interface between the molten slag 6 and the molten iron 5 is located close to the cinder notch 7, the separation performance between the molten slag 6 and the molten iron 5 deteriorates.

<Processes after Molten Slag and Molten Iron are Discharged>

The molten slag 6 is reduced with carbon in the electric furnace 1, and the reduced iron and the reduced slag are stored in the molten iron 5 and the molten slag layer on the molten iron 5, respectively. For example, the molten slag 6 with the amount of approximately 46 tons is discharged from the cinder notch 7 once every hour, and the molten iron 5 with the amount of approximately 44 tons is discharged from the tap hole 8 once every five hours. Examples of composition of the discharged slag and composition of the discharged molten iron 5 are shown in Table 2 and Table 3, respectively.

TABLE 2

|  | (T. Fe) | (M. Fe) | (CaO) | (SiO$_2$) | (Al$_2$O$_3$) | (MnO) | (MgO) | (mass %) (P$_2$O$_5$) |
|---|---|---|---|---|---|---|---|---|
| Discharged slag | 1.0 | 0 | 41.3 | 34.4 | 12 | 3.9 | 6.9 | 0.28 |

TABLE 3

|  | [C] | [Si] | [Mn] | [P] | (mass %) [S] |
|---|---|---|---|---|---|
| Discharged molten iron | 3.0 | 0.01 | 0.82 | 1.38 | 0.040 |

It should be noted that, as the charge of the hot steel-making slag 6' and the discharge of the molten slag 6 after the reduction processing are repeated, [Mn] (concentration of Mn) and [P] (concentration of P) in the composition of the molten iron tend to increase, which leads to a decrease in the degree of reductions. Thus, the molten iron 5 in the electric furnace 1 is replaced as appropriate.

The molten slag 6 discharged from the cinder notch 7 is subjected to a granulated and rapid-cooling process on the site, or is received in a container to be subjected to slow cooling, thereby obtaining a product. In other words, the discharged molten slag 6 is prevented from crystallizing through rapid cooling to make a cement raw material, or is subjected to slow cooling to facilitate crystallization and is used for various applications such as civil engineering materials or replacement for natural stones. The method of rapid cooling includes a granulated process, and the method of slow cooling includes, for example, natural cooling in a mold.

The molten iron 5 discharged from the tap hole 8 has a high concentration of P, and hence, is subjected to a dephosphorization process by adding oxygen or iron oxide, and dephosphorization agents. After the molten iron 5 is dephosphorized to have P: 0.080 to 0.150 mass %, the molten iron 5 in the molten state is mixed with blast-furnace molten iron for recycle or is cast for use as molded pig iron. The target phosphorus concentration after the dephosphorization is set to be almost equal to the phosphorus concentration discharged from the blast furnace, and the accumulation of phosphorus in the steelmaking processes is avoided.

At this time, as for the dephosphorization agent, converter slag is mainly added, and further, for example, quick lime, dolomite, sodium carbonate, ore powder, and calcium-ferrite are added depending on applications. Further, if temperatures are low, oxygen blowing may be applied. The molten iron 5 after the dephosphorization is formed into molded pig iron, or is transferred to a ladle car or molten iron pot, and then, is transported to a steelmaking process. The dephosphorized slag generated through the dephosphorization process has high P$_2$O$_5$ of for example, 10 mass % or more, and hence, can be used as raw material for phosphate fertilizer or industrial phosphoric acid material.

EXAMPLES

Next, Examples of the present invention will be described. The conditions described in Examples are merely examples of conditions given for confirming feasibility and effects of the present invention, and conditions related to the present invention are not limited to these examples of condition. The present invention may employ various conditions, provided that they do not depart from the main points of the present invention and the object of the present invention can be achieved.

Example 1

In a device illustrated in FIG. 2, the hot steel-making slag 6' discharged from a converter in a high-temperature molten state (rate of solid phase: not more than 30%) was charged into the slag supplying container 9, and was temporarily contained and maintained. Then, the slag supplying container 9 was tilted once every 10 minutes to intermittently charge the hot steel-making slag 6' with approximately 8 tons for each charge into the direct-current electric furnace 1.

The hot steel-making slag 6' was charged into the electric furnace 1 under conditions where pig iron with approximately 130 tons was contained in the electric furnace 1 and a molten slag layer subjected to reduction processing existed on the pig iron with a thickness of approximately 200 mm. Note that the reason for setting the amount of inflow of the hot steel-making slag 6' to approximately 8 tons for each charge is that it has been checked, through preliminary experiments using an actual device, that strong foaming does not occur under this condition.

Further, the rate of inflow of the hot steel-making slag 6' was set to average 800 kg/min. This rate was calculated on the basis of the electric power consumption rate that is necessary for the reduction processing of the steel-making slag and is obtained through the method described above in order to continuously supply electric power of approximately 30 MW as described below.

Coke ash was supplied from the auxiliary-raw-material supplying tube 14a into the electric furnace 1 while the electric power is being supplied. This supplying rate was set to 85 kg/min, which corresponds to 1.5 times as fast as the stoichiometric supplying rate. Further, as for the slag modifying agent, fly ash: 378 kg/t-slag and bauxite powder: 47 kg/t-slag were continuously supplied from the auxiliary-raw-material supplying tube 14a onto the molten slag layer to achieve the target basicity: 1.2 and target (Al$_2$O$_3$): 12 mass %.

The electric furnace 1 was controlled to be molten iron temperatures: 1450±5° C. and slag temperatures: 1550±5° C. Since the electric furnace 1 was not provided with any opening that communicates with the external air, the inside of the electric furnace 1 was maintained to be the reducing atmosphere. Table 4 shows compositions of the molten slag 6 charged into the electric furnace 1 and temperatures thereof.

TABLE 4

|  | (T. Fe) | (M. Fe) | (CaO) | (SiO$_2$) | (MnO) | (MgO) | (P$_2$O$_5$) | (mass %) Temperature |
|---|---|---|---|---|---|---|---|---|
| Charged slag | 18.6 | 2.0 | 49.0 | 12.2 | 6.1 | 8.2 | 1.5 | 1450° C. |

The electric furnace 1 always contained pig iron (C, 3.0 mass %) having the composition shown in Table 1 with the amount of 100 to 150 tons, and the molten slag layer with the thickness of approximately 100 to 300 mm. For the electric furnace 1, the electric power of approximately 30 MW was continuously supplied from the electrode 2 to continuously apply reduction processing to the molten slag 6 without causing the overflow of the molten slag 6.

The molten slag 6 was discharged once every hour with the amount of approximately 46 tons from the cinder notch 7, and the molten iron 5 was discharged once every five hours with the amount of approximately 44 tons from the tap hole 8.

From the components of the discharged molten slag 6 and the components of the discharged molten iron 5, it can be found that the slags were reduced as shown in Table 2 and Table 3, and the concentrations of P and Mn in the molten iron 5 increased.

TABLE 5

|  | (T. Fe) | (M. Fe) | (CaO) | ($SiO_2$) | ($Al_2O_3$) | (MnO) | (MgO) | (mass %) ($P_2O_5$) |
|---|---|---|---|---|---|---|---|---|
| Discharged slag | 1.1 | 0 | 40.5 | 32.7 | 12 | 4.7 | 9.7 | 0.28 |

TABLE 6

|  | [C] | [Si] | [Mn] | [P] | (mass %) [S] |
|---|---|---|---|---|---|
| Discharged molten iron | 4.2 | 0.01 | 0.80 | 1.40 | 0.038 |

The electric power consumption rate necessary for reduction processing of the molten slag 6 was 607 kWh/t-slag in the case of decarbonized slag at 1450° C. On the other hand, for the purpose of comparison, the same decarbonized slag was supplied in a form of cold powder. As a result, the electric power consumption rate was 1314 kWh/t-slag.

Example 2

The molten slag 6 was subjected to a reduction and modification process under the same conditions as those for Example 1 except that the hollow electrode 3 was used for the electrode 2, and, in place of the auxiliary-raw-material supplying tube 14a, the hollow portion of the hollow electrode 3 was used as the auxiliary-raw-material supplying tube 14a for supplying the slag modifying agent and the reducing agent.

Temperatures in the electric furnace 1 were controlled so as to be molten iron temperatures: 1450±5° C., and slag temperatures: 1550±5° C. The reduction processing of the molten slag 6 was continuously performed without causing the overflow of the molten slag 6.

During the reduction processing, the molten slag 6 was discharged once every hour with the amount of approximately 46 tons from the cinder notch 7, and the molten iron 5 was discharged once every five hours with the amount of approximately 44 tons from the tap hole 8. The components of the discharged molten slag 6 and the components of the discharged molten iron 5 were almost the same as those shown in Table 2 and Table 3.

Example 3

Slag were subjected to reduction processing under the same conditions as those in Example 1 except that, in the electric furnace 1, pig iron (C; 4.1 mass %) having components shown in Table 7 and having the concentration of C higher than that of Examples 1 and 2 was used, the slag supplying container 9 was tilted once every five minutes, and the amount of inflow of the hot steel-making slag 6' is set to be approximately 4 tons for each charge.

TABLE 7

|  | [C] | [Si] | [Mn] | [P] | [S] | (mass %) Temperature |
|---|---|---|---|---|---|---|
| Composition of molten iron | 4.1 | 0.01 | 0.32 | 0.12 | 0.024 | 1450° C. |

It should be noted that the reason for setting the amount of inflow of the hot steel-making slag 6' to approximately 4 tons for each charge is that it has been confirmed, through preliminary experiments using an actual device, that strong foaming does not occur under the condition of Example 3 in which the molten pig iron has a concentration of C higher than that of Examples 1 and 2. As a result, the reduction processing of the molten slag 6 could be continuously performed without causing the overflow of the molten slag 6.

During the reduction processing, the molten slag 6 was discharged once every hour with the amount of approximately 46 tons from the cinder notch 7, and the molten iron 5 was discharged once every five hours with the amount of approximately 44 tons from the tap hole 8. From the components of the discharged molten slag 6 and the components of the discharged molten iron 5, it was found that, as shown in Table 5 and Table 6, the slag were reduced, and the concentrations of P and Mn in the molten iron 5 were increased.

In Examples 1 and 2, the hot steel-making slag 6' with the amount of approximately 8 tons was charged once every 10 minutes simultaneously. In Example 3, the hot steel-making slag 6' with the amount of approximately 4 tons was charged once every five minutes at the same time. Under these charging conditions, the reduction processing of the molten slag 6 was continuously performed without causing the overflow of the molten slag 6. Further, the rate of inflow of the hot steel-making slag 6' was 800 kg/min on average.

This means that, in the case where the hot steel-making slag 6' is continuously charged at charging rates of 800 kg/min, or at charging rates of not more than 800 kg/min, the foaming is less likely to occur, and under these conditions, the reduction processing of the molten slag 6 can be continuously performed without causing the overflow of the molten slag 6. In other words, Examples 1 to 3, which employ intermittent charging, are examples that demonstrate the continuous charging of the hot steel-making slag 6'.

Comparative Example

In order to reduce the hot steel-making slag 6' having the components shown in Table 4, the steel-making slag with the amount of 20 tons in a hot state was supplied at once into the electric furnace 1 containing the molten iron 5 having the components shown in Table 1. After the hot steel-making slag 6' is supplied into the electric furnace 1, the slag foaming suddenly occurred, and hence, the operation had to be stopped.

INDUSTRIAL APPLICABILITY

As described above, according to the present invention, it is possible to modify the steel-making slag into a material that can be used for various applications such as a cement raw material, a civil engineering material, and a ceramic product, while recovering valuable elements such as Fe, Mn, and P into a molten iron by reduction. Then, Fe and Mn are recycled into steel making processes, and P is used as a phosphate fertilizer or a phosphoric acid material. Therefore, the present invention is highly applicable to smelting techniques in the steel industry.

BRIEF DESCRIPTION OF THE REFERENCE SYMBOLS

1 Electric furnace
1a, 1b Furnace side wall
1c Furnace ceiling
2 Electrode
2a Upper electrode
2b Furnace bottom electrode
3 Hollow electrode
4 Slag supplying portion
5 Molten iron
6 Molten slag
6' Hot steel-making slag
7 Cinder notch
8 Tap hole
9 Slag supplying container
10 Bottom wall
11 Upper wall
12 Nozzle
12a Burner
13 Exhausting portion
13a Opening portion
13b Lid
14a Auxiliary-raw-material supplying tube
14b Lance for blowing auxiliary raw material
A Arc
C Carbon material powder
F FeO powder
z Tilting axis

The invention claimed is:

1. A method of reduction processing of steel-making slag, including:
   a hot steel-making slag inflow process of continuously or intermittently charging, from a slag supplying container, hot steel-making slag to a molten slag layer on a molten iron contained in an electric furnace while adjusting an amount of inflow with the slag supplying container;
   a reducing agent supplying process of supplying a reducing agent to the molten slag layer;
   an electrifying and heating process of heating the molten iron and the molten slag layer through application of electric power; and
   a reduction process of continuing reduction processing of the hot steel-making slag in a non-oxidizing atmosphere while intermittently discharging the molten slag of the molten slag layer or the molten iron.

2. The method of reduction processing of steel-making slag according to claim 1, wherein the hot steel-making slag inflow process includes:
   adjusting the amount of inflow of the hot steel-making slag to the molten slag layer based on an amount of electric power supplied to the electric furnace.

3. The method of reduction processing of steel-making slag according to claim 1, wherein the reduction process includes:
   discharging, through the slag supplying container, exhaust gas emitted from the electric furnace.

4. The method of reduction processing of steel-making slag according to claim 1, further including:
   a slag modifying agent supplying process of continuously or intermittently supplying a slag modifying agent to the molten slag layer.

5. The method of reduction processing of steel-making slag according to claim 1, further including:
   a suspending process of adding, in the molten slag layer, a carbon material with an amount not less than 1.1 times and not more than 1.6 times a stoichiometric amount necessary for reduction reaction with the molten slag, thereby suspending the carbon material in the molten slag layer.

6. The method of reduction processing of steel-making slag according to claim 1, wherein a concentration of C in the molten iron is not more than 3 mass %.

* * * * *